(12) United States Patent
Hofmann et al.

(10) Patent No.: US 11,753,734 B2
(45) Date of Patent: *Sep. 12, 2023

(54) METHOD FOR EMBEDDING INSERTS, FASTENERS AND FEATURES INTO METAL CORE TRUSS PANELS

(71) Applicant: California Institute of Technology, Pasadena, CA (US)

(72) Inventors: Douglas C. Hofmann, Altadena, CA (US); Scott N. Roberts, Altadena, CA (US)

(73) Assignee: California Institute of Technology, Pasadena, CA (US)

(*) Notice: Subject to any disclaimer, the term of this patent is extended or adjusted under 35 U.S.C. 154(b) by 57 days.

This patent is subject to a terminal disclaimer.

(21) Appl. No.: 17/191,409

(22) Filed: Mar. 3, 2021

(65) Prior Publication Data
US 2021/0207281 A1 Jul. 8, 2021

Related U.S. Application Data

(63) Continuation of application No. 15/346,592, filed on Nov. 8, 2016, now Pat. No. 10,968,527.

(60) Provisional application No. 62/254,332, filed on Nov. 12, 2015.

(51) Int. Cl.
   *C25D 5/56* (2006.01)
   *C25D 3/12* (2006.01)
   (Continued)

(52) U.S. Cl.
   CPC ............ *C25D 5/56* (2013.01); *B29C 64/135* (2017.08); *B29C 70/021* (2013.01); *B29C 70/70* (2013.01);
   (Continued)

(58) Field of Classification Search
   CPC .......... C25D 5/56; C25D 7/00; C25D 7/0614
   See application file for complete search history.

(56) References Cited

U.S. PATENT DOCUMENTS

| 4,584,036 A | 4/1986 | Taub et al. |
| 5,002,798 A | 3/1991 | Donley et al. |

(Continued)

FOREIGN PATENT DOCUMENTS

| CN | 203227820 U | 10/2013 |
| DE | 112018001284 T5 | 11/2019 |

(Continued)

OTHER PUBLICATIONS

Lee et al., "Crystallization-Induced Plasticity of Cu—Zr Containing Bulk Amorphous Alloys", Acta Materialia, 2006, vol. 54, pp. 349-355.

(Continued)

*Primary Examiner* — Christopher T Schatz

(57) ABSTRACT

Systems and method for fabricating a metal core truss panel with seamlessly embedded features in accordance with embodiments of the invention are illustrated. One embodiment includes a method for producing a metal core truss panel composite, the method including fabricating a sacrificial core truss panel including a plurality of interconnected truss members and at least one embedded feature, and plating the sacrificial core truss panel with a layer of metal forming a metal core truss panel including a plurality of interconnected metal truss members and at least one seamlessly embedded metal feature.

17 Claims, 10 Drawing Sheets

(51) Int. Cl.
  *C25D 7/00* (2006.01)
  *B33Y 10/00* (2015.01)
  *B33Y 80/00* (2015.01)
  *C23C 18/31* (2006.01)
  *C23C 18/16* (2006.01)
  *B29C 64/135* (2017.01)
  *B29C 70/70* (2006.01)
  *B29D 99/00* (2010.01)
  *B29C 70/02* (2006.01)
  *B29C 70/72* (2006.01)
  *B29K 705/00* (2006.01)
  *B29L 7/00* (2006.01)

(52) U.S. Cl.
  CPC .......... *B29C 70/72* (2013.01); *B29D 99/0089* (2013.01); *B33Y 10/00* (2014.12); *B33Y 80/00* (2014.12); *C23C 18/165* (2013.01); *C23C 18/31* (2013.01); *C25D 3/12* (2013.01); *C25D 7/00* (2013.01); *B29K 2705/00* (2013.01); *B29L 2007/002* (2013.01)

(56) References Cited

U.S. PATENT DOCUMENTS

| | | |
|---|---|---|
| 5,005,456 A | 4/1991 | Ballard et al. |
| 5,417,385 A | 5/1995 | Arnold et al. |
| 5,985,204 A | 11/1999 | Otsuka et al. |
| 6,162,130 A | 12/2000 | Masumoto et al. |
| 6,325,087 B1 | 12/2001 | Tarr |
| 6,732,606 B1 | 5/2004 | Zhu et al. |
| 7,540,929 B2 | 6/2009 | Demetriou et al. |
| 8,496,077 B2 | 7/2013 | Nesnas et al. |
| 8,639,484 B2 | 1/2014 | Wei et al. |
| 9,211,564 B2 | 12/2015 | Hofmann |
| 9,689,231 B2 | 6/2017 | Fripp et al. |
| 10,081,136 B2 | 9/2018 | Hofmann et al. |
| 10,471,652 B2 | 11/2019 | Hofmann et al. |
| 10,487,934 B2 | 11/2019 | Kennett et al. |
| 10,941,847 B2 | 3/2021 | Hofmann et al. |
| 10,946,447 B2 | 3/2021 | Hofmann |
| 10,953,688 B2 | 3/2021 | Parness et al. |
| 10,968,527 B2 | 4/2021 | Hofmann et al. |
| 11,155,907 B2 | 10/2021 | Hofmann et al. |
| 11,168,776 B2 | 11/2021 | Hofmann et al. |
| 2003/0052105 A1 | 3/2003 | Nagano et al. |
| 2004/0035502 A1 | 2/2004 | Kang et al. |
| 2005/0211340 A1 | 9/2005 | Kim et al. |
| 2005/0263932 A1 | 12/2005 | Heugel |
| 2006/0105011 A1 | 5/2006 | Sun et al. |
| 2007/0039689 A1 | 2/2007 | Petersson et al. |
| 2007/0228592 A1 | 10/2007 | Dunn et al. |
| 2007/0270942 A1 | 11/2007 | Thomas |
| 2008/0190521 A1 | 8/2008 | Loffler et al. |
| 2008/0304975 A1 | 12/2008 | Clark et al. |
| 2009/0263582 A1 | 10/2009 | Batchelder |
| 2009/0277540 A1 | 11/2009 | Langlet |
| 2012/0132631 A1 | 5/2012 | Wescott et al. |
| 2012/0133080 A1 | 5/2012 | Moussa et al. |
| 2013/0009338 A1 | 1/2013 | Mayer |
| 2013/0048152 A1 | 2/2013 | Na et al. |
| 2013/0143060 A1* | 6/2013 | Jacobsen .............. B29C 71/02  156/278 |
| 2013/0255837 A1 | 10/2013 | Peker et al. |
| 2013/0277891 A1 | 10/2013 | Teulet |
| 2013/0280547 A1 | 10/2013 | Brandl et al. |
| 2014/0020794 A1 | 1/2014 | Hofmann et al. |
| 2014/0048969 A1 | 2/2014 | Swanson et al. |
| 2014/0070445 A1 | 3/2014 | Mayer |
| 2014/0090752 A1 | 4/2014 | Waniuk et al. |
| 2014/0141164 A1 | 5/2014 | Hofmann |
| 2014/0163717 A1 | 6/2014 | Das et al. |
| 2014/0332120 A1 | 11/2014 | Liu et al. |
| 2014/0334106 A1 | 11/2014 | Prest et al. |
| 2015/0014885 A1 | 1/2015 | Hofmann et al. |
| 2015/0044084 A1 | 2/2015 | Hofmann et al. |
| 2015/0045924 A1* | 2/2015 | Cluckers ............... B29C 64/393  700/98 |
| 2015/0165693 A1 | 6/2015 | Sagoo et al. |
| 2015/0183169 A1 | 7/2015 | Ehsani |
| 2015/0209094 A1 | 7/2015 | Anderson |
| 2015/0209889 A1 | 7/2015 | Peters et al. |
| 2015/0219572 A1 | 8/2015 | Beuth, Jr. et al. |
| 2015/0284035 A1 | 10/2015 | Reese |
| 2015/0298443 A1 | 10/2015 | Hundley et al. |
| 2015/0299825 A1 | 10/2015 | Poole et al. |
| 2015/0323053 A1 | 11/2015 | El-Wardany et al. |
| 2015/0352794 A1 | 12/2015 | Nguyen et al. |
| 2016/0023438 A1 | 1/2016 | Johnson et al. |
| 2016/0175929 A1 | 6/2016 | Colin et al. |
| 2016/0233089 A1 | 8/2016 | Zenou et al. |
| 2016/0242877 A1 | 8/2016 | Bernhard |
| 2016/0361765 A1 | 12/2016 | Danger et al. |
| 2017/0021417 A1 | 1/2017 | Martin et al. |
| 2017/0050241 A1 | 2/2017 | Thomas et al. |
| 2017/0137955 A1 | 5/2017 | Hofmann et al. |
| 2017/0211168 A1 | 7/2017 | Liu et al. |
| 2017/0226619 A1 | 8/2017 | Hofmann et al. |
| 2018/0257141 A1 | 9/2018 | Hofmann et al. |
| 2018/0272432 A1 | 9/2018 | Jonsson et al. |
| 2018/0339338 A1 | 11/2018 | Hofmann et al. |
| 2018/0339342 A1 | 11/2018 | Hofmann |
| 2018/0345366 A1 | 12/2018 | Hofmann |
| 2019/0009464 A1 | 1/2019 | Steege |
| 2019/0022923 A1 | 1/2019 | Hofmann et al. |
| 2019/0037721 A1 | 1/2019 | Curran et al. |
| 2019/0255635 A1 | 8/2019 | HÄnni et al. |
| 2019/0314903 A1 | 10/2019 | Haenle et al. |
| 2020/0000595 A1 | 1/2020 | Jones et al. |
| 2020/0278016 A1 | 9/2020 | Hofmann et al. |
| 2020/0278017 A1 | 9/2020 | Hofmann et al. |
| 2020/0282582 A1 | 9/2020 | Hofmann et al. |
| 2020/0284146 A1 | 9/2020 | Yahnker et al. |
| 2020/0406579 A1 | 12/2020 | Hahnlen |
| 2021/0254699 A1 | 8/2021 | Hofmann et al. |

FOREIGN PATENT DOCUMENTS

| | | |
|---|---|---|
| EP | 3630392 A1 | 4/2020 |
| EP | 3630395 A1 | 4/2020 |
| EP | 3630397 A2 | 4/2020 |
| EP | 3129677 B1 | 9/2021 |
| JP | 60116775 A | 6/1985 |
| JP | 62227070 A | 10/1987 |
| JP | 2004315340 A | 11/2004 |
| JP | 5249932 B2 | 7/2013 |
| JP | 2018149655 A | 9/2018 |
| KR | 101420176 B1 | 7/2014 |
| KR | 1020190119154 A | 10/2019 |
| KR | 10-2020-0004435 A | 1/2020 |
| KR | 1020200011470 A | 2/2020 |
| WO | 2005077560 A1 | 8/2005 |
| WO | 2006073428 A2 | 7/2006 |
| WO | 2008058896 A1 | 5/2008 |
| WO | 2010027317 A1 | 3/2010 |
| WO | 2012083922 A1 | 6/2012 |
| WO | 2016116562 A1 | 7/2016 |
| WO | 2018165662 A1 | 9/2018 |
| WO | 2018218077 A1 | 11/2018 |
| WO | 2018218247 A1 | 11/2018 |
| WO | 2018223117 A2 | 12/2018 |
| WO | 2018223117 A3 | 1/2019 |

OTHER PUBLICATIONS

Extended European Search Report for European Application No. 18806700.3, Search completed Oct. 20, 2020, dated Oct. 28, 2020, 7 Pgs.

Extended European Search Report for European Application No. 18809486.6, Search completed Sep. 30, 2030, dated Oct. 12, 2020, 7 Pgs.

(56) References Cited

OTHER PUBLICATIONS

International Preliminary Report on Patentability for International Application PCT/US2018/035813, Report issued Dec. 3, 2019, dated Dec. 12, 2019, 9 Pgs.
International Preliminary Report on Patentability for International Application PCT/US2018/022020, Report issued Sep. 10, 2019, dated Sep. 19, 2019, 10 Pgs.
International Preliminary Report on Patentability for International Application PCT/US2018/034481, Report issued Nov. 26, 2019, dated Dec. 5, 2019, 17 Pgs.
International Preliminary Report on Patentability for International Application PCT/US2018/034924, Report issued Nov. 26, 2019, dated Dec. 5, 2019, 13 Pgs.
International Search Report and Written Opinion for International Application No. PCT/US2018/022020, Search completed Jul. 2, 2018, dated Jul. 3, 2018, 12 Pgs.
International Search Report and Written Opinion for International Application No. PCT/US2018/034481, Search completed Sep. 10, 2018, dated Sep. 10, 2018, 19 Pgs.
International Search Report and Written Opinion for International Application No. PCT/US2018/034924, Search completed Sep. 18, 2018, dated Sep. 19, 2018, 15 Pgs.
International Search Report and Written Opinion for International Application No. PCT/US2018/035813, Search completed Dec. 12, 2018, dated Dec. 12, 2018, 11 Pgs.
Berger, "A Survey of Additive Manufacturing Processes Applied on the Fabrication of Gears", 1st International Conference on Progress in Additive Manufacturing (Pro-AM 2014), May 26-28, 2014, pp. 315-320, doi: 10.3850/978-981-09-0446-3_010.
Bordeenithikasem et al., "Glass forming ability, flexural strength, and wear properties of additively manufactured Zr-based bulk metallic glasses produced through laser powder bed fusion", Additive Manufacturing, Mar. 21, 2018, vol. 21, pp. 312-317, https://doi.org/10.1016/j.addma.2018.03.023.
Byrne et al., "Bulk Metallic Glasses", Science, Jul. 25, 2008, vol. 321, pp. 502-503, doi: 10.1126/science.1158864.
Cheung et al., "Thermal and mechanical properties of Cu—Zr—Al bulk metallic glasses", Journal of Alloys and Compounds 434-435 (2007) 71-74.
Dai et al., "High-performance bulk Ti—Cu—Ni—Sn—Ta nanocomposites based on a dendrite-eutectic microstructure", Journal of Materials Research, Sep. 2004, vol. 19, No. 9, pp. 2557-2566, DOI: 10.1557/JMR.2004.0332.
Davis, "Gear Materials, Properties, and Manufacture", ASM International 2005 Chapters 1-3 pp. 1-78.
Gu et al., "Selective Laser Melting Additive Manufacturing of Ti-Based Nanocomposites: The Role of Nanopowder", Metallurgical and Materials Transactions A, Jan. 2014, vol. 45, pp. 464-476, DOI: 10.1007/s11661-013-1968-4.
Guo et al., "Tensile ductility and necking of metallic glass", Nature Materials, Oct. 2007, vol. 6, pp. 735-739, published online Aug. 19, 2007, doi: 10.1038/nmat1984.
He et al., "Novel Ti-base nanostructure-dendrite composite with enhanced plasticity", Nature Materials, Jan. 2003, Published Dec. 8, 2002, vol. 2, pp. 33-37, doi: 10.1038/nmat792.
Jiang et al., "Microstructure evolution and mechanical properties of $Cu_{46}Zr_{47}A_{l7}$ bulk metallic glass composite containing CuZr crystallizing phases", Materials Science and Engineering A 467 (2007) 139-145.

Johnson et al., "Quantifying the Origin of Metallic Glass Formation", Nature Communications, Jan. 20, 2016, vol. 7, 10313, 7 pgs. doi: 10.1038/ncomms10313.
Jung et al., "Fabrication of Fe-based bulk metallic glass by selective laser melting: A parameter study", Materials and Design, Jul. 30, 2015, vol. 86, pp. 703-708, http://dx.doi.org/10.1016/j.matdes.2015.07.145.
Kumar et al., "Embrittlement of Zr-based Bulk Metallic Glasses", Science Direct, Acta Materialia, 2009, vol. 57, pp. 3572-3583, available online May 11, 2009, doi:10.1016/j.actamat.2009.04.16.
Li et al., "Selective laser melting of Zr-based bulk metallic glasses: Processing, microstructure and mechanical properties", Materials and Design, Sep. 21, 2016, vol. 112, pp. 217-226, http://dx.doi.org/10.1016/j.matdes.2016.09.071.
Lin et al., "Designing a toxic-element-free Ti-based amorphous alloy with Yemarkable supercooled liquid region for biomedical application", Intermetallics, Jul. 9, 2014, vol. 55, pp. 22-27, http://dx.doi.org/10.1016/j.intermet.2014.07.003.
Lu et al., "Crystallization Prediction on Laser Three-Dimensional Printing of Zr-based Bulk Metallic Glass", Journal of Non-Crystalline Solids, 2017, vol. 461, pp. 12-17, available online Jan. 29, 2017, http://dx.doi.0rg/10.1016/j.jnoncrysol.2017.01.038.
Madge, "Toughness of Bulk Metallic Glasses", Metals, Jul. 17, 2015, vol. 5, Issue 3, pp. 1279-1305, ISSN 2075-4701, doi:10.3390/met5031279.
Mahbooba et al., "Additive manufacturing of an iron-based bulk metallic glass Targer than the critical casting thickness", Applied Materials Today, Feb. 27, 2018, vol. 11, pp. 264-269, https://doi.org/10.1016/j.apmt.2018.02.011.
Pauly et al., "Processing Metallic Glasses by Selective Laser Melting", Materials Today, Jan./Feb. 2013, vol. 16, pp. 37-41 http://dx.org/10.1016/j.mattod.2013.01.018.
Qiao et al., "Metallic Glass Matrix Composites", Materials Science and Engineering, Feb. 2016, vol. 100, pp. 1-69, http://dx.doi.org.10.10163/jmser.2015.12.001.
Shen et al., "3D printing of large, complex metallic glass structures", Materials and Design, Mar. 2017, vol. 117, pp. 213-222, http://dx.doi.org/10.1016/j.matdes.2016.12.087.
Whang et al., "Microstructures and age hardening of rapidly quenched Ti—Zr—Si alloys", Journal of Materials Science Letters, 1985, vol. 4, pp. 883-887.
Yao et al., "Fe-Based Bulk Metallic Glass with High Plasticity", Applied Physics Letters, Feb. 5, 2007, vol. 90, 061901, doi: 10.1063/1.2437722.
Yokoyama et al., "Relations between the Thermal and Mechanical Properties of Cast Zr—TM—Al (TM: Cu, Ni, or Co) Bulk Glassy Alloys", Materials Transactions, vol. 48, No. 7 (2007) pp. 1846-1849.
Yokoyama et al., "Tough Hypoeutectic Zr-Based Bulk Metallic Glasses", Metallurgical and Materials Transactions, Year 2011, vol. 42A, pp. 1468-1475, DOI: 10.1007/s11661-011-0631-1.
Zhuo et al., "Spray Formed Al-Based Amorphous Matrix Nanocomposite Plate", Journal of Alloys and Compounds, Mar. 1, 2011, vol. 509, pp. L169-L173, doi:10.1016/j.jallcom.2011.02.125.
Liu et al., , "Effect of Minor Alloying Additions on Glass Formation in Bulk Metallic Glasses", Intermetallics 13 (2005) 415-418.
Park et al., , "Enhancement of plasticity in Ti-rich Ti—Zr—Be—Cu—Ni bulk metallic glasses", Scripta Materialia 53 (2005) 1-6.

* cited by examiner

METHOD FOR EMBEDDING INSERTS, FASTENERS AND FEATURES INTO METAL CORE TRUSS PANELS

CROSS-REFERENCE TO RELATED APPLICATIONS

The current application is a continuation of U.S. patent application Ser. No. 15/346,592 to Hofmann et al. entitled "Method for Embedding Inserts, Fasteners and Features into Metal Core Truss Panels," filed Nov. 8, 2016, which claims the benefit of and priority under 35 U.S.C. § 119(e) to U.S. Provisional Patent Application No. 62/254,332 to Hofmann et al, entitled "A Method for Embedding Inserts, Fasteners and Features into Metal Core Truss Panels," filed Nov. 12, 2015, the disclosures of which are incorporated herein by reference in their entireties.

STATEMENT REGARDING FEDERALLY SPONSORED RESEARCH OR DEVELOPMENT

The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention generally relates to methods for embedding features into core truss panels.

BACKGROUND

In materials engineering, materials with a high strength-to-weight ratio are highly desired. The lower weight allows for reduced costs in transportation, operational use, and, in some instances, fabrication of the material. Recently, there is an increasing availability of new composite materials that are designed to surpass conventional, monolithic materials in terms of lower densities and higher structural strengths. Composite materials can be defined as structures made through the combination of two or more materials. The combined composite typically has significantly different physical and/or chemical characteristics from the individual materials. A very common example of a composite material is concrete. Concrete is typically made of steel reinforcement bars surrounded by cured cement. Steel reinforcement bars alone would flex too much while cement alone would easily crack without the structural support of steel reinforcement bars. However, when combined to create a composite, an extremely rigid material is created.

Another class of composite materials includes multi-layered composites designed to have a high strength-to-weight ratio. These composite materials are typically made up of an ultra-low density core panel and two face sheet panels on either side of the core panel. To achieve a high strength-to-density ratio, ultra-low density core panels are typically designed to have an ordered structure with a high surface area per unit volume and significant, open porosity. For example, many core panels are designed to have honeycomb structures, which are structures made up of vertical walls arranged in tessellating hexagonal columns. This arrangement allows for a structure with minimal density while maintaining a relatively high compressive strength with respect to forces acting on the axis normal to the panel. Another example of an ultra-low density structure is a truss structure. Truss structures are typically defined as three-dimensional frames composed of linear truss members interconnected in an ordered pattern. This ordered pattern results in a structure with minimal density and high tensile and compressive strengths with respect to all axes.

Common examples of composite materials that are widely used in lightweight engineering applications are carbon fiber composites. Carbon fiber is a low density material with high strength that can be combined with other materials in many ways to form panels or other structures for engineering applications. For example, carbon fiber panel sheets can be combined with an aluminum honeycomb core to produce a multi-layered composite material that serves as an excellent, lower-density replacement for monolithic metals.

SUMMARY OF THE INVENTION

Systems and methods for fabricating a metal core truss panel with seamlessly embedded features in accordance with embodiments of the invention are illustrated. One embodiment includes a method for producing a metal core truss panel composite, the method including fabricating a sacrificial core truss panel including a plurality of interconnected truss members and at least one embedded feature, and plating the sacrificial core truss panel with a layer of metal forming a metal core truss panel including a plurality of interconnected metal truss members and at least one seamlessly embedded metal feature.

In another embodiment, the method includes providing an amount of uncured monomer, and curing the amount of uncured monomer into cured polymer, wherein the cured polymer forms the plurality of interconnected truss members and the at least one embedded feature.

In a further embodiment, the method includes removing the sacrificial core truss panel leaving behind the metal core truss panel including a plurality of interconnected hollow metal truss members and the at least one seamlessly embedded hollow metal feature.

In still another embodiment, the method includes providing an amount of uncured monomer, curing the amount of uncured monomer into cured polymer, wherein the cured polymer forms the plurality of interconnected truss members, providing a feature, and attaching the feature to a section of the plurality of interconnected truss member.

In a still further embodiment, the method includes removing the sacrificial core truss panel leaving behind the metal core truss panel including a plurality of interconnected hollow metal truss members and the at least one seamlessly embedded metal feature.

In yet another embodiment, the feature includes an insert core truss panel and an embedded feature, wherein attaching the feature includes removing a portion of the sacrificial core truss panel, wherein the removed portion is the same size as the insert core truss panel, and bonding the insert core truss panel into the sacrificial core truss panel where the removed portion used to be.

In a yet further embodiment, the insert core truss panel includes a plurality of insert interconnected truss members with each of the insert interconnected truss members having an approximately similar diameter as each of the plurality of interconnected truss members.

In another additional embodiment, the uncured monomer is cured using stereolithography fabrication and the feature is provided by 3D printing fabrication.

In a further additional embodiment, fabricating a sacrificial core truss panel includes providing an amount of uncured monomer, providing a feature, placing the feature into the amount of uncured monomer, and curing the amount of uncured monomer into cured polymer, wherein the cured polymer forms the plurality of interconnected truss members, wherein the feature is embedded in the plurality of interconnected truss members.

In another embodiment again, the feature includes a type of metal.

In a further embodiment again, the type of metal is selected from the group consisting of metallic glass, Al, Ti, Ni, and Au.

In still yet another embodiment, at least one of the at least one embedded feature is selected from the group consisting of an insert, a flexure, a latch, a hook, and a bolting device.

In a still yet further embodiment, the at least one embedded feature includes undersized screw threads such that plating the sacrificial core truss panel forms at least one seamlessly embedded metal feature including standard sized metal screw threads.

In still another additional embodiment, the sacrificial truss panel is plated using a method selected from the group consisting of electroplating, electrolessly plating, and sputtering.

In a still further additional embodiment, the method includes filling in hollow spaces between the plurality of interconnected metal truss members with a type of material.

In still another embodiment again, the method includes filling in the plurality of interconnected hollow metal truss members with a type of material.

In a still further embodiment again, the method includes attaching a face sheet to the metal core truss panel, the face sheet defining a hole that allows access to the at least one seamlessly embedded metal feature.

In yet another additional embodiment, the face sheet includes a carbon fiber laminate material.

In a yet further additional embodiment, the carbon fiber laminate material includes at least one embedded layer of metallic glass.

In yet another embodiment again, the face sheet includes a material selected from the group consisting of metallic glass, monolithic metal, and metal alloy.

In a yet further embodiment again, the face sheet includes a monolithic metal selected from the group consisting of Al, Ti, W, Mo, Ta, V, Nb, Cu, Ni and Fe.

In another additional embodiment again, the sacrificial core truss panel is curved.

In a further additional embodiment again includes a method for producing a metal core truss panel composite, the method including fabricating a sacrificial core truss panel including a plurality of interconnected truss members, plating the sacrificial core truss panel with a layer of metal forming a metal core truss panel including a plurality of interconnected metal truss members, attaching a face sheet to the metal core truss panel, drilling a hole through the face sheet and into the metal core truss panel, providing a feature, inserting the feature into the drilled hole, and bonding the feature to the metal core truss panel.

In still yet another additional embodiment, the drilled hole includes an outer perimeter and the feature includes expanding features that extend beyond the outer perimeter of the drilled hole for latching.

In a still yet further additional embodiment, the layer of metal is an amorphous metal, also known as a metallic glass.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Turning now to the drawings, methods for embedding inserts, fasteners, and features into metal core truss panels are illustrated. A composite material can be formed by attaching a face sheet panel to each side of a metal core truss panel. A core truss panel is typically a three-dimensional structure that includes interconnected and intersecting linear truss members extending in at least three different axes. The truss members can be arranged in an ordered pattern and, depending on the number of axes in which the truss members extend, form repeating tetrahedral units, repeating octahedral units, or any other structure capable of tessellation. In some embodiments, the truss members are hollowed. The ordered pattern and/or hollow nature of the truss members allows formation of a core truss panel that can be characterized as having ultra-low density, high strength-todensity ratio, high surface-to-volume ratio, and high porosity (open volume fraction). The degree of these characteristics depends on several factors, such as but not limited to, the chosen tessellated pattern, the inner and outer diameters of the truss members, and the material used in fabrication.

In many engineering applications, features can be used to provide a number of capabilities and functions. Features can include a wide variety of components. For example, in U.S. patent application Ser. No. 15/067,561, Hofmann et al. discloses a variety of inserts for structurally interrelating components. The disclosure of U.S. patent application Ser. No. 15/067,561 is hereby incorporated by reference in its entirety. In other examples, engineered structures can contain simple fasteners, such as screw devices and bolt devices, which allow panels of materials to be attached. Other features can include but are not limited to latches, flexures, hooks, cabling, bolts, and fins.

In traditional applications, many engineered parts are typically formed from monolithic metals, such as titanium, steel, or aluminum. The mechanical robustness of these monolithic metals allows for bolt holes, screw holes, or other fastening devices to be machined directly into the material without substantially affecting the structural integrity. This traditional approach does not translate well into many classes of composite materials. As composite materials are typically made up of different materials and different layers, they cannot easily be machined or threaded without adversely affecting the structural integrity of the interface between the different materials.

Figure 1:
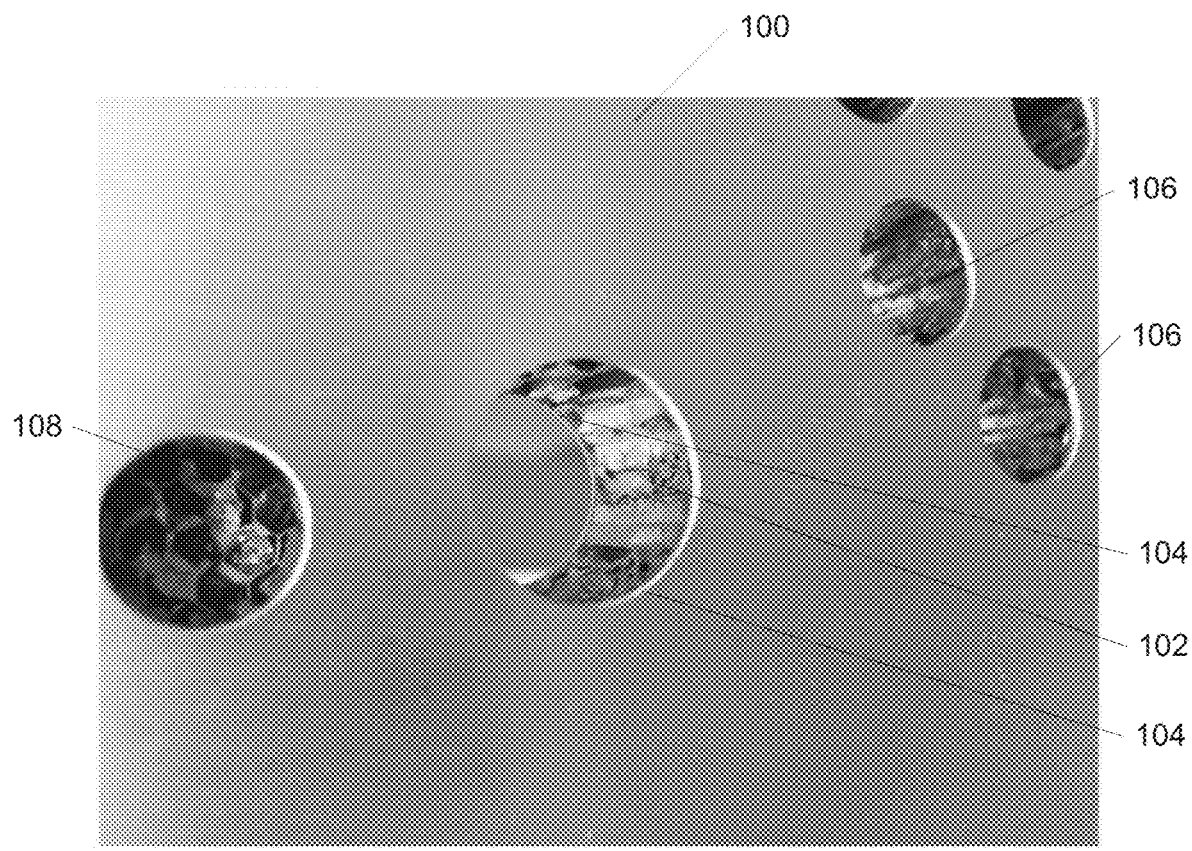
FIG. 1 illustrates a composite panel with drilled holes exposing the interior core panel.

For example, carbon fiber composites have limitations in terms of embedding fasteners and other features. They cannot easily be machined or threaded and are prone to fracture if over-machined. Since complex features cannot be directly machined into carbon fiber composites, a typical practice for embedding these features is to drill a simple cylindrical hole into the panel and then insert and epoxy bond a pre-shaped metal insert into the cylindrical hole. FIG. 1 shows a composite material 100 made of a honeycomb core panel 102 sandwiched between two face sheet panels 104. Several through holes 106 are shown where inserts can be placed and bonded in. The core panel's honeycomb structure can be seen clearly in the leftmost through hole 108.

Figure 2A:
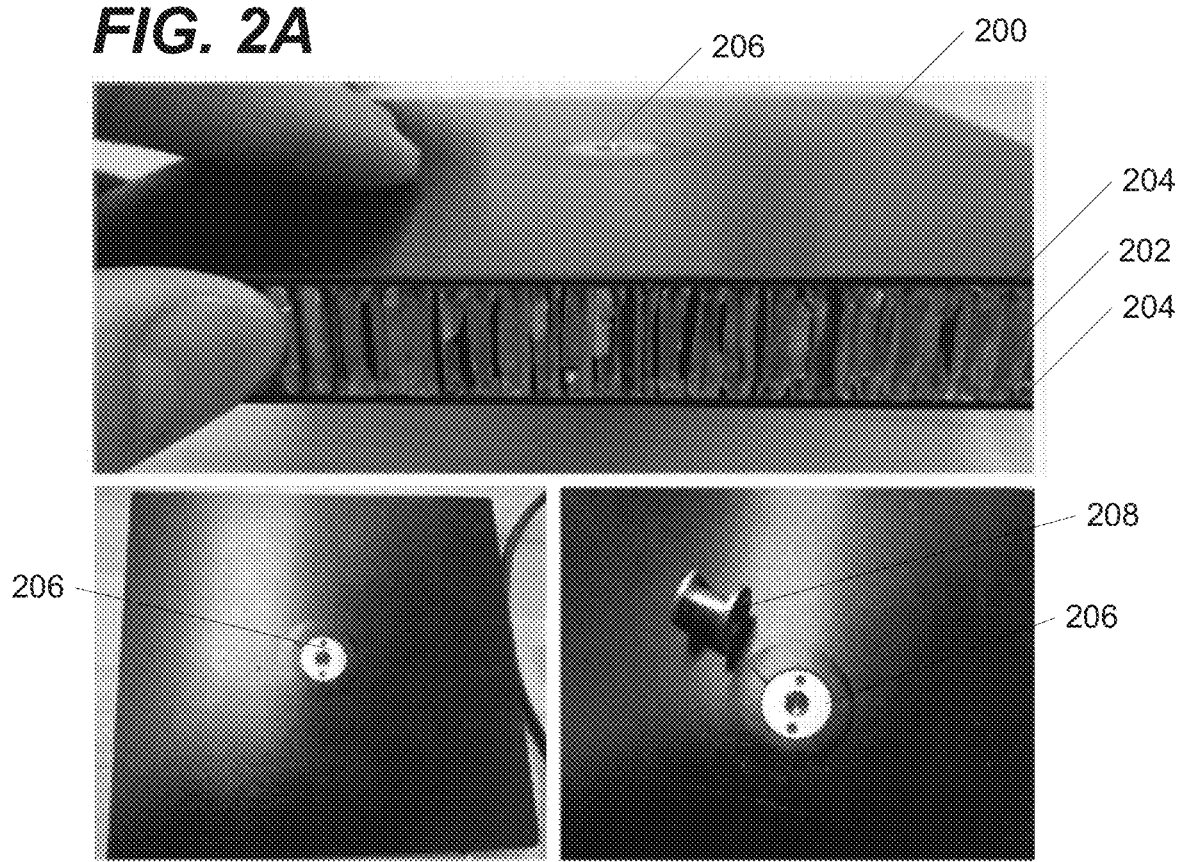
FIG. 2A C illustrate a carbon fiber-aluminum composite with both an embedded insert and a detached insert.
Figure 2B:
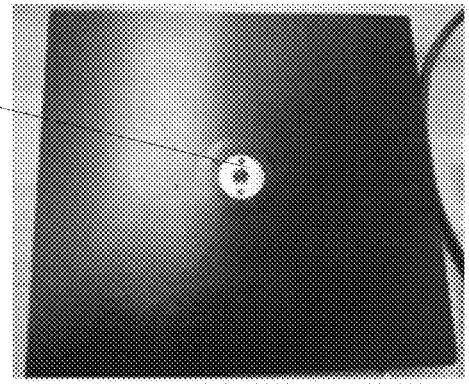
Figure 2C:
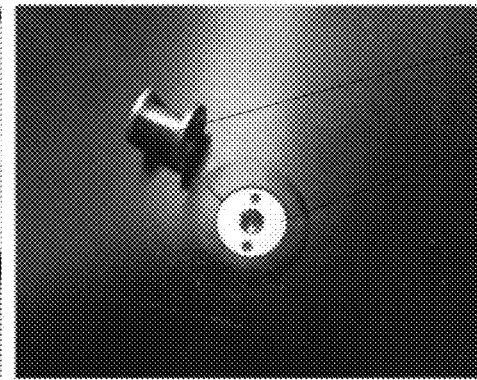

Metal inserts can be machined to be threaded to receive a joining bolt or any other feature that is difficult to machine in a composite material. The metal inserts are typically monolithic and mechanically robust enough to survive being screwed into repeatedly with a bolt or other fasteners. FIGS. 2A-2C show a carbon fiber-aluminum composite 200 made up of an aluminum honeycomb core panel 202 sandwiched between two carbon fiber face sheets 204 with an embedded metal insert 206. A sideview of a detached metal insert 208 can be seen in FIG. 2C. This technique of embedding metal inserts introduces a new problem where excessive load in the joined parts causes the epoxy bond adhesion to mechanically fail, resulting in the metal insert being dislodged from the composite panel. This mechanically failure is independent of the composite material's characteristics and, therefore, is typically a bottleneck in the stress capacity of the embedded inserts. One method of preventing the "pull-out" phenomenon is to fabricate a composite material that has the feature intimately and seamlessly bonded with the composite material. Another problem with conventional metal inserts is that they are typically machined from a block of metal. Machining these metal inserts is time consuming, especially when the inserts contain threaded holes and complicated surface features such as threads and undercuts.

Embodiments of the present invention disclose methods of fabricating core truss panels that have intimately embedded features. The features are typically made of the same material as the core truss panel and are intimately embedded into the core truss panel such that the features are seamlessly connected to the truss structure. This seamless connection prevents the "pull-out" phenomenon by eliminating the epoxy bond bottleneck, allowing load to be better dispersed throughout the structure.

A core truss panel with seamlessly embedded features can be fabricated using a variety of methods. In many embodiments, a metal core truss panel is formed by plating a sacrificial core truss panel with metal. In further embodiments, the sacrificial core truss panel is removed, leaving behind a free-standing hollow metal core truss panel with the same features as the sacrificial core truss panel. In other embodiments, the sacrificial core truss panel is plated with a composite material. In some embodiments, the features are fabricated into the sacrificial core truss panel before the plating process. In a variety of embodiments, the features are fabricated separately and added into the sacrificial core truss panel before the plating process.

In many embodiments, the metal core truss panel is attached to face sheet panels. Face sheet panels can be made of a variety of materials. In some embodiment, the face sheet panel is made of a monolithic metal. In a number of embodiments, the face sheet panel is made of a carbon fiber laminate material. In further embodiments, the face sheet panel is made of a carbon fiber laminate material with layers of metallic glass embedded in the carbon fiber. The face sheet panels can include drilled holes to match the placement of the features, allowing external access to the features.

The fabrication methods for embedding inserts, fasteners, and features into metal core truss panels in accordance with embodiments of the invention are discussed further below.

Fabrication of a Sacrificial Core Truss Panel

A sacrificial core truss panel can be fabricated using any method that allows for the construction of a three-dimensional object, including the methods described below. The sacrificial core truss panel can be made of any material capable of being fabricated to form a truss pattern, such as but not limited to polymers, metals, composites, concrete, and wood. In many embodiments, the sacrificial core truss panel is made of a type of polymer that is chosen for its dissolvability or its ability to be converted into a different material via burning.

In a variety of embodiments, the sacrificial core truss panel is fabricated using conventional three-dimensional printing methods. Conventional three-dimensional printing methods are typically additive processes used to create three-dimensional objects by laying down and curing successive layers of material, typically a type of polymer. In some embodiments, light and/or heat can be used to cure and/or bond the layers of materials together. In other embodiments, the layers of materials can inherently bond with each other.

Figure 3:
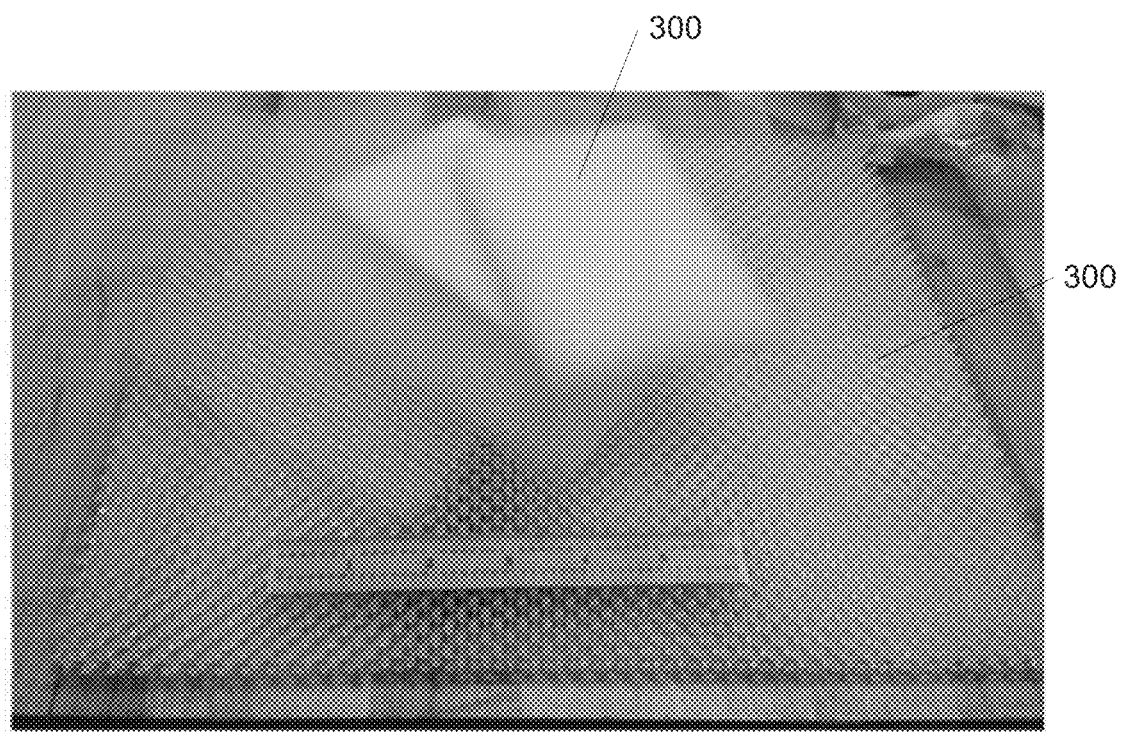
FIG. 3 conceptually illustrates several fabricated polymer core truss panels in accordance with an embodiment of the invention.

In a number of embodiments, the sacrificial core truss panel is fabricated using stereolithography. In stereolithography, a photomonomer resin, typically in liquid or semi-solid form, can be used as building material. Photomonomer resins are photosensitive monomers that can be polymerized when exposed to their respective appropriate wavelength range, typically of the ultraviolet spectrum. During stereolithography fabrication, a computer-controlled laser can be used to polymerize, or cure, patterns of photomonomers to create solid polymer layers that are bonded to the previous cured layer. Several polymer sacrificial core truss panels 300 fabricated using stereolithographic techniques and conventional 3D printing in accordance with some embodiments of the invention are shown in FIG. 3.

In many embodiments, the sacrificial core truss panel is fabricated using self-propagating polymer waveguides. Self-propagating polymer waveguides can enable rapid fabrication of periodic truss structures compared to other lithographic techniques. The method typically involves placing a mask with at least one aperture, typically circular, over a volume of photomonomer. A collimated light source can then be directed through the mask to polymerize a specific portion of the liquid monomer into a solid polymer at the point of exposure to the light. Subsequent incident light can be trapped in the solid polymer due to internal reflection caused by the refractive index change between the uncured monomer and cured polymer, preventing the surrounding monomer from polymerization. The photomonomer can be chosen for its refractive index change between the cured and uncured stages to allow for internal reflection at certain angles of incidence. This self-trapping effect can direct the light towards the far end of the already-formed polymer, turning the already-formed polymer into a truss member that can act as a waveguide. When the light reaches the far end of the already-formed polymer, further polymerization can occur, extending the already-formed polymer in the direction of the light until the desired length is achieved or the monomer reservoir's depth is reached. After the exposure period, excess monomer can be rinsed off.

Several characteristics of the core truss panel can be engineered during the light exposure phase. The length of the truss members can be controlled by modifying the exposure time. The diameter of the truss members can be controlled by changing the aperture's size and/or exposure time. The shape of the aperture can determine the shape of the truss members, or waveguides. In many embodiments, the aperture is circular, resulting in substantially cylindrical truss members. In other embodiments, the aperture is a square, resulting in truss members with a substantially rectangular prism shape. The angle of the truss members, or waveguides, can be controlled through the incident angle of the collimated light with respect to the mask surface. In a number of embodiments, several collimated light sources are concurrently directed through several apertures in the mask at different, calculated angles to form a desired core truss panel pattern. In some embodiments, one collimated light source is used successively to create the desired pattern. Numerous patterns can be created depending on several factors including but not limited to the angles used, the number of different angles used, and the placement of the apertures. In a variety of embodiments, the core truss panel pattern includes repeating tetrahedral units. In further embodiments, the core truss panel pattern includes repeating octahedral units.

Fabrication of a Metal Core Truss Panel

A metal core truss panel can be fabricated using any number of methods including those described below. In many embodiments, the metal core truss panel is fabricated by plating a sacrificial core truss panel. In some embodiments, the sacrificial core truss panel is removed after the plating process, leaving behind a free-standing hollow metal core truss panel. In further embodiments, the sacrificial core truss panel is made of a polymer designed to be easily dissolvable/etched and is removed from the metal core truss panel by using a dissolving/etching agent. A sacrificial core truss panel can be plated using any number of methods including those described below. Plating processes typically involves coating a substrate, the sacrificial core truss panel in this case, with a layer of material. Depending on the plating process used, many types of metals, alloys, and composites can be used to coat the substrate.

In many embodiments, electroplating is used to plate the sacrificial core truss panel with a layer of metal. In further embodiments, the sacrificial core truss panel is electroplated with a layer of nickel. Electroplating refers to a process that can be used to deposit a layer of material, usually a nonreactive metal, onto a conductive substrate without damaging the substrate. A typically setup can involve immersing the substrate and the target metal in an aqueous metal solution and providing a direct current to the target metal, oxidizing the metal into dissolved metal ions. Simultaneously, the metal ions in the aqueous solution can be reduced and deposited onto the substrate, "plating" it. In some embodiments, the sacrificial core truss panel is covered with a conductive seed layer, such as but not limited to a copper layer, before the plating.

In a number of embodiments, electroless nickel plating is used to plate the sacrificial core truss panel. In further embodiments, the sacrificial core truss panel is electrolessly plated with a layer of nickel-phosphorus. Electroless nickel plating refers to a process that can be used to deposit a layer of material, typically a nickel alloy, onto a substrate without the use of an electrical current. The process typically includes a pretreatment cleaning of the substrate to prepare it for plating. Then, a reducing agent can be used to react with metal ions to deposit the metal onto the substrate through an autocatalytic chemical reaction. Although electroless plating is usually used to deposit a nickel-phosphorus alloy, it can also be used to plate a substrate with a composite coating. In a more recent embodiment, aluminum plating has been developed to plate the sacrificial core truss panel with low-density material.

In a variety of embodiments, the sacrificial core truss panel is plated with a layer of metal using sputter coating. Sputter coating typically involves coating a substrate with a source material through ejection of source material onto the substrate. The sputtering process can include placing the substrate to be coated and source material into a vacuumed chamber and introducing an inert gas. A negative charge can then be applied to source material, causing electrons to flow through the environment. The electrons can collide with the inert gas, knocking off electrons from the inert gas. The now positively charged gas can be attracted to the negatively charged source material. This attraction can cause a high velocity bombardment of the source material, causing ejection of the source material, which is then deposited onto the substrate.

Figure 4A:
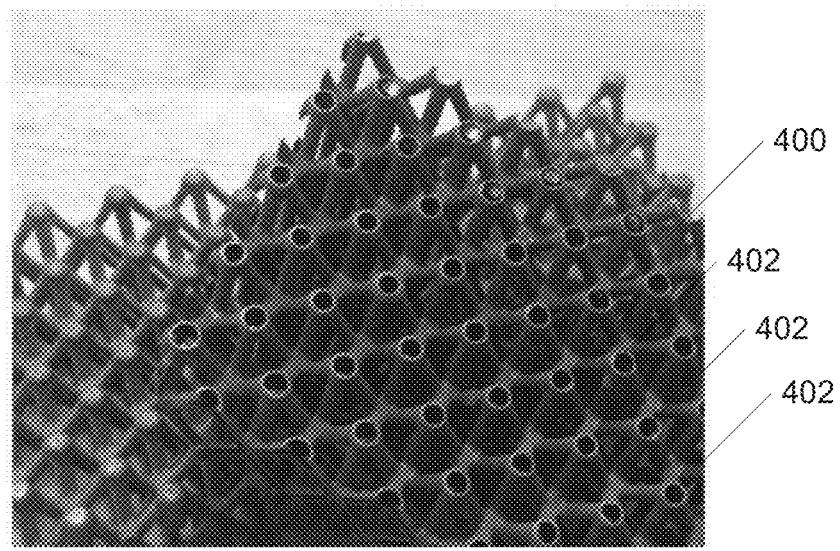
FIG. 4A conceptually illustrates a metalized hollow core truss panel in accordance with an embodiment of the invention.
Figure 4B:
FIG. 4B conceptually illustrates a metalized core truss panel next to a polymer core truss panel in accordance with an embodiment of the invention.

After the sacrificial core truss panel is plated, the sacrificial core truss panel can be removed to leave behind a free-standing hollow core truss panel made of the plated material. In embodiments where the sacrificial core truss panel is to be removed, the plating process can be modified to not plate at least one area from which the byproducts of the removal process can escape. For example, in embodiments utilizing electroplating, coverings, such as but not limited to waxes, lacquers, and tape, can be used to prevent plating of at least one area of the sacrificial core truss panel to not be plated, preventing total encapsulation of the sacrificial core truss panel by the plating material. In other embodiments, the sacrificial core truss panel is completely encapsulated by the metal layer. The encapsulated sacrificial core truss panel can be sliced open to expose the sacrificial core truss panel, allowing removal access of the sacrificial core truss panel. Several methods can be used to remove the sacrificial core truss panel. In many embodiments, the sacrificial core truss panel is dissolved using a dissolving agent through the non-plated area. In other embodiments, the sacrificial core truss panel is etched off. In some embodiments, the sacrificial core truss panel is burned off. FIG. 4A conceptually illustrates a close up of a hollow metal core truss panel 400 in accordance with an embodiment of the invention. Nodes 402 show non-plated areas that allows for the byproducts of the removal of the sacrificial core truss panel to escape. A comparison between a hollow metal core truss panel 400 and a sacrificial core truss panel 404 in accordance with an embodiment of the invention is conceptually illustrated in FIG. 4B. In further embodiments, the hollow metal core truss panel is filled with a type of material. In still further embodiments, the space between the truss members is filled with a type of material. The filled material can be chosen to improve radiation shielding of the panel, ballistic performance of the panel, heat flow in the panel, or any other performance metric.

In a further embodiment, the sacrificial core truss panel can be fabricated using a pre-ceramic polymer that is converted into a ceramic through the application of heat. In other embodiments, the sacrificial polymer core truss panel is converted into carbon or graphite via pyrolysis, where the application of heat reduces the polymer into carbon. Instead of removing the sacrificial truss material, the conversion into carbon or ceramic creates a high-melting temperature, high-strength template which can be used to apply metal coatings in a method that would normally destroy a polymer. In another embodiment, the carbon or ceramic truss can be covered with metal through thermal spraying, sputtering, cold spraying, or direct immersion into molten metal followed by removal of excess. In a number of embodiments, the ceramic or carbon trusses is dipped into a molten metallic glass and then cooled rapidly to form complex, low-density metallic glass trusses. Regardless of the differences in the plating methods, the application of the current disclosure for integrating seamless features is the same.

Embedding Features

Figure 5A:
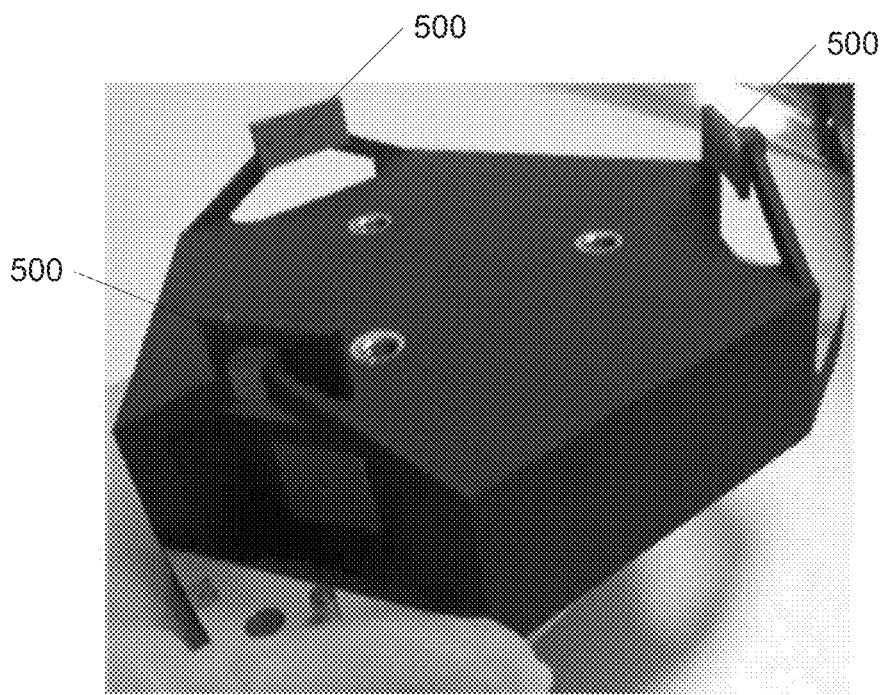
FIG. 5A illustrates a machined bipod flexure in accordance with an embodiment of the invention.
Figure 5B:
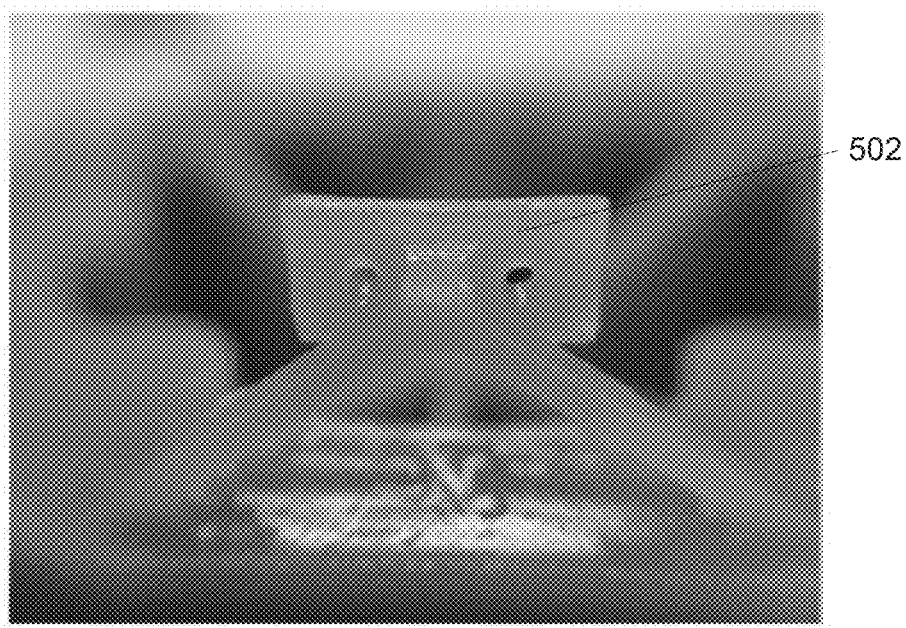
FIG. 5B conceptually illustrates a polymer bipod flexure fabricated seamlessly into a polymer core truss panel in accordance with an embodiment of the invention.
Figure 6A:
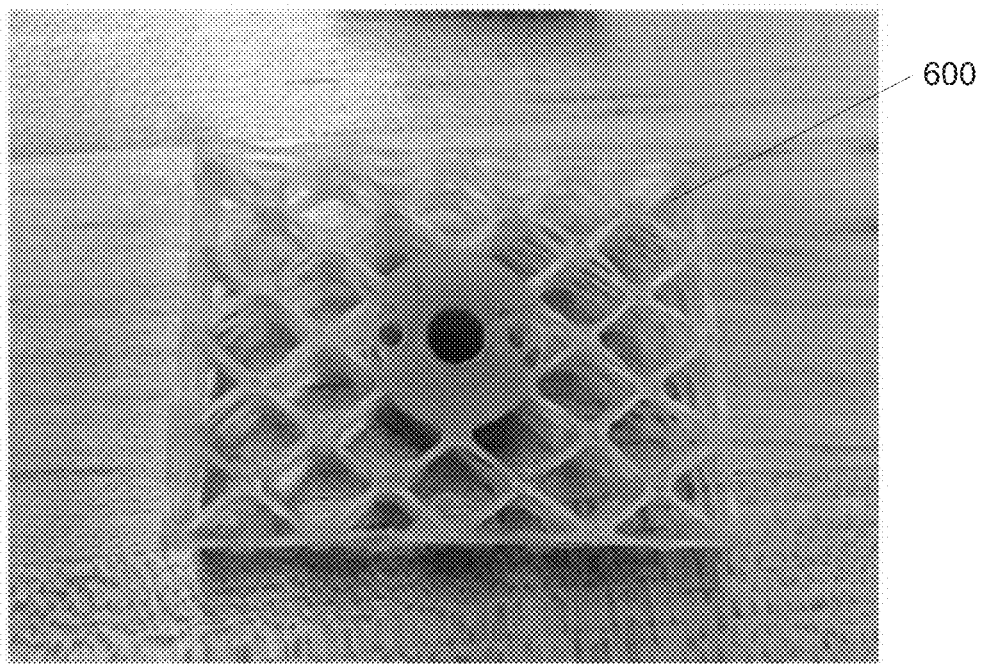
FIG. 6A conceptually illustrates a polymer core truss panel with a seamlessly embedded feature fabricated using a conventional 3D printing method in accordance with an embodiment of the invention.
Figure 6B:
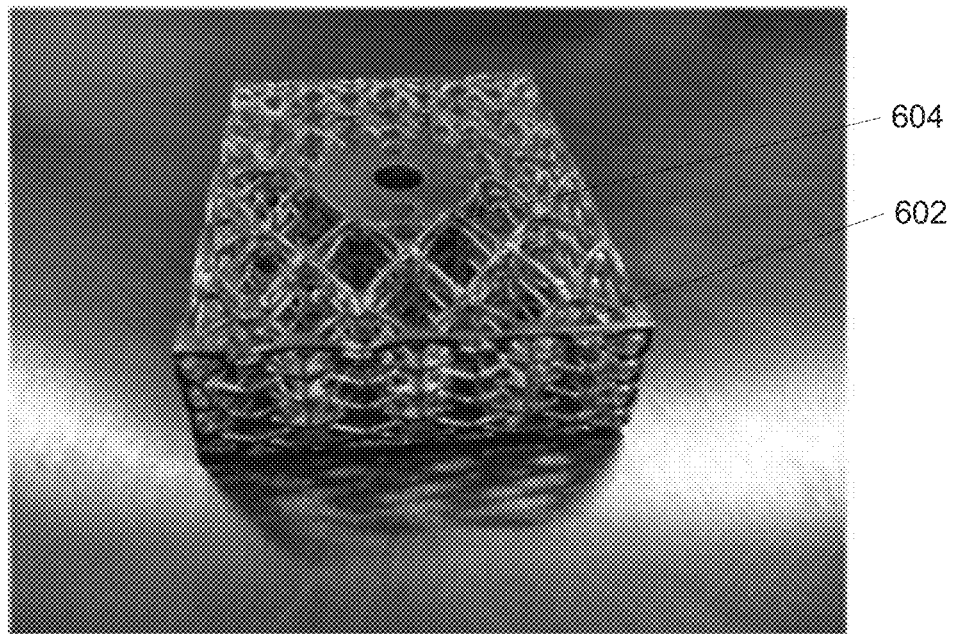
FIG. 6B conceptually illustrates a metallized core truss panel with a seamlessly embedded feature in accordance with an embodiment of the invention.

Features, such as but not limited to inserts, flexures, latches, hooks, bolts, and other fasteners, can be intimately embedded into metal core truss panels such that the features are seamlessly connected with the truss structure. This can be achieved using any number of methods including those described below. In many embodiments, the features are fabricated concurrently as part of the sacrificial core truss panel in a single printing operation, resulting in a seamless connection. For example, in embodiments utilizing computer aided design to fabricate the sacrificial core truss panel, such as but not limited to conventional three-dimensional printing and stereolithography, the design can incorporate the features as part of the sacrificial core truss panel. One type of feature that can be incorporated into the sacrificial core truss panel in accordance with an embodiment of the invention is conceptually illustrated in FIG. 5A-5B. FIG. 5A conceptually illustrates a machined insert with bipod flexures 500 that can be used to hold an optic. FIG. 5B conceptually illustrates the same bipod flexures 502 fabricated in polymer as part of the sacrificial core truss panel. After fabrication, the sacrificial core truss panel can be plated, which also results in the plating of the features, using any of the methods described above to produce a metal core truss panel with seamlessly embedded metal features. FIG. 6A-6B conceptually illustrates the visual differences between a polymer core truss panel 600 before the plating process and a metal core truss panel 602 after the plating process in accordance with an embodiment of the invention. In embodiments involving the removal of the sacrificial core truss panel, the seamlessly embedded features 604 can also be hollow after the removal process. The embedded feature could also be made of metal 208 and could be seamlessly embedded into a polymer truss before converting to metal or into a ceramic or carbon truss after conversion of the polymer. The metallizing of the truss would also add additional metal to an existing metal feature which would then be intimately connected to the truss after metallization.

Figure 7:
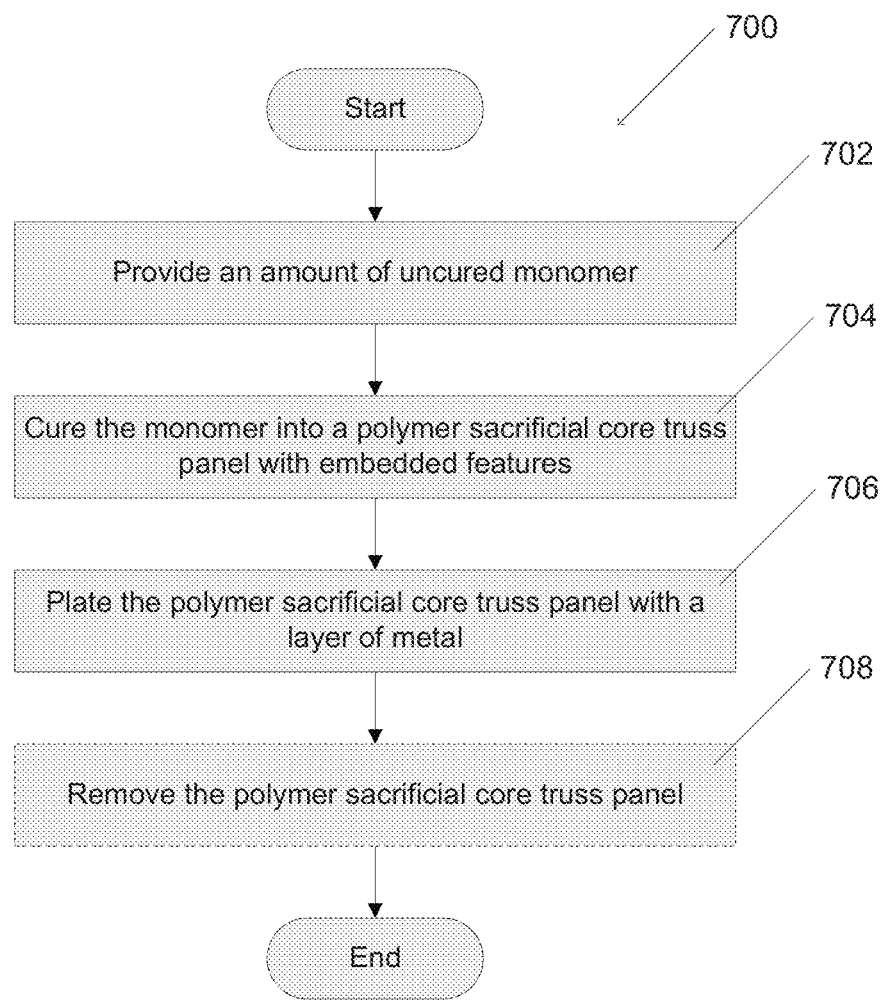
FIG. 7 conceptually illustrates a process of fabricating a metal core truss panel with a seamlessly embedded feature in accordance with an embodiment of the invention.

A process 700 that can be utilized to fabricate a metal core truss panel with seamlessly embedded features in accordance with an embodiment of the invention is conceptually illustrated in FIG. 7. Uncured monomer can be provided as raw materials for the fabrication process (702). The type of monomer provided can be chosen for its curing attributes and/or the resulting polymer's dissolving attributes. The uncured monomer can be cured into a sacrificial core truss panel made of polymer (704). The sacrificial core truss panel can be cured using a variety of methods depending on the monomer used. For example, if the monomer used is a photocurable monomer, a computer aided laser can be used to cure the monomer. The design followed by the computer aided laser can be a core truss panel with the feature included. The sacrificial core truss panel with the embedded feature can be plated with a layer of metal (706). Plating methods can include electroplating, electrolessly plating, and sputter coating. The method chosen can depend on the availability of resources, desired plating material, and desired thickness. After plating, the sacrificial core truss panel can optionally be removed (708). Removal of the sacrificial core truss panel requires the plating process to leave certain areas of the sacrificial core truss panel non-plated. Different types of coverings such as but not limited to waxes, lacquers, and tape can be used to designate an area to be non-plated. A number of methods such as but not limited to dissolving, etching, and burning can be used to remove the sacrificial core truss panel.

Although a specific process for fabricating a metal core truss panel with seamlessly embedded features is conceptually illustrated in FIG. 7, any of a variety of processes can be utilized as appropriate to the requirements of specific applications in accordance with an embodiment of the invention.

Because of the vast different speeds and design complexity among the fabricating methods, it is practicable to separately fabricate a smaller feature using a slower fabricating method, which typically allows for more complex designs, and to fabricate a regular core truss panel using a faster fabricating method. For example, self-propagating polymer waveguide methods allow for rapid fabrication of a core truss panel. However, these methods have limitations regarding the fabrication of complex features. A solution to this would be to fabricate a regular core truss panel using the fast self-propagating polymer waveguide method and to separately fabricate a feature using a slower fabrication method that allows for complex designs. The feature can be separately fabricated using any number of methods and can be made of any type of material, such as but not limited to polymers and metals. In some embodiments, the feature can be fabricated using conventional three-dimensional printing or stereolithography. In other embodiments, the feature is machined from a block of metal. The feature can later be inserted into the core truss panel before the plating process using any number of methods including those described below.

Figure 8:
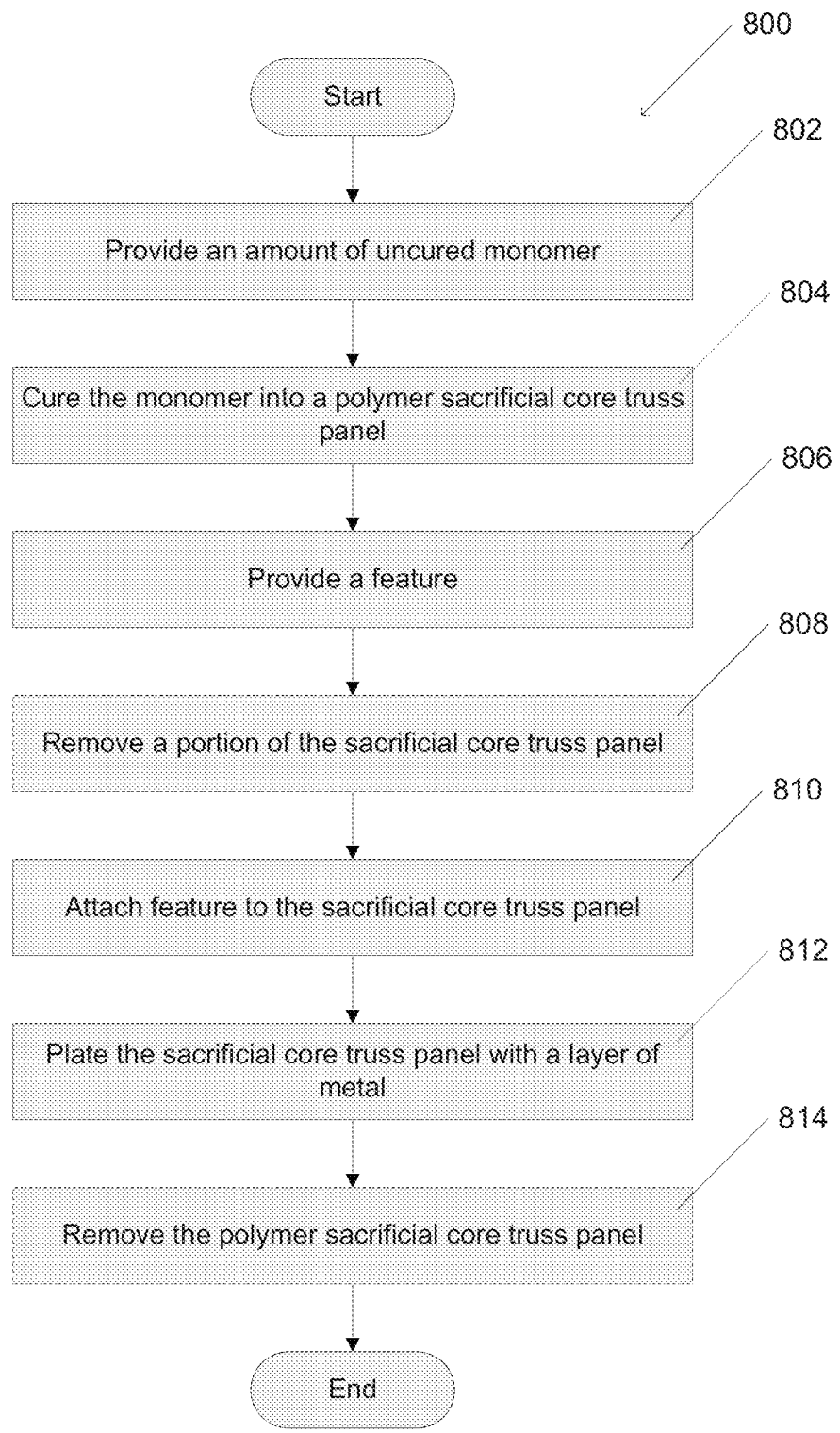
FIG. 8 conceptually illustrates a process 800 for fabricating a metal core truss using separately fabricated core truss panels and features in accordance with an embodiment of the invention FIG. 9 conceptually illustrates how a smaller core truss panel with an embedded feature can be combined with a larger core truss panel prior to metallization in accordance with an embodiment of the invention.

FIG. 8 conceptually illustrates a process 800 for fabricating a metal core truss using separately fabricated core truss panels and features in accordance with an embodiment of the invention. Uncured monomer can be provided as raw materials for the fabrication process (802). The uncured monomer can be cured into a sacrificial core truss panel made of polymer (804). A feature can be provided (806). Features can be made of a variety of materials and can include a variety of devices performing different functions. Features can also be fabricated using a variety of methods. Some features can be an embedded feature in a smaller truss. The truss can include truss members that have substantially similar diameters to the truss members of the sacrificial core truss panel. A portion of the sacrificial core truss panel can optionally be removed (808). Depending on how the sacrificial core truss panel was fabricated and the characteristics of the feature, a portion of the sacrificial core truss panel can be removed to create a space for receiving the feature. The feature can be attached to the sacrificial core truss panel (810). A variety of methods can be used to attach the feature to the sacrificial core truss panel. The feature can be bonded to the sacrificial core truss panel with heat, epoxy, or adhesion to cured polymer. The feature can also simply be set in sacrificial core truss panel without any additional bonding. The sacrificial core truss panel can be plated with a layer of metal (812). The sacrificial core truss panel can optionally be removed (814).

Although a specific process for fabricating metal core truss using separately fabricated core truss panels and features is conceptually illustrated in FIG. 8, any of a variety of processes can be utilized as appropriate to the requirements of specific applications in accordance with an embodiment of the invention.

Figure 9:
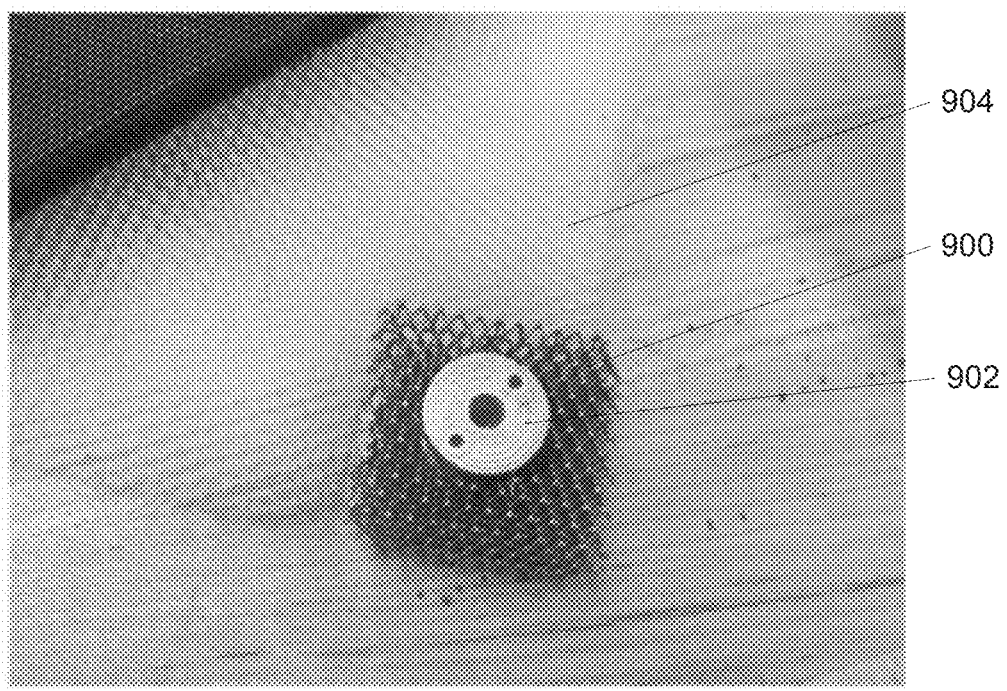

In many embodiments, a separately fabricated feature can be embedded during the fabrication process of the sacrificial core truss panel. For example, in embodiments utilizing stereolithography in the fabrication of the sacrificial core truss panel, the separately fabricated feature can be inserted in the middle of the fabrication process and the monomer can be cured around the feature, embedding the feature into the sacrificial core truss panel. In some embodiments, a separately fabricated feature can be embedded after the fabrication of a sacrificial core truss panel. A section of the fabricated sacrificial core truss panel can be removed and the separately fabricated feature can be inserted and bonded to the empty space in the sacrificial core truss panel. The separately fabricated feature can be bonded to the sacrificial core truss panel using any number of bonding methods, such as but not limited to epoxy, heat, and tape. In a number of embodiments, a feature can be fabricated into a smaller truss with the same geometry as the larger sacrificial core truss panel. An appropriately sized section can then be excised from the larger sacrificial core truss panel and the smaller truss can be inserted. After the sacrificial core truss panel is embedded with a feature using any of the methods described above, the sacrificial core truss can be plated using any of the methods described above to produce a metal core truss panel with seamlessly embedded features. In many such embodiments the separately fabricated feature may itself be made of metal and then further coated with metal to seamlessly interconnect with the rest of the core truss. FIG. 9 conceptually illustrates a smaller truss 900 with an embedded insert 902 in accordance with an embodiment of the invention. The smaller truss 900 can include truss members having substantially similar diameters as the truss members of the larger sacrificial core truss panel 904. The similar sized diameters allows for a smooth connection after plating.

In embodiments involving the removal of the sacrificial core truss, the separately fabricated and embedded feature can either be removed or left in the metal core truss panel depending on the type of material used in the fabrication of the feature and the metal core truss panel's purpose of use. For example, in many embodiments, the separately fabricated feature is made of the same polymer as the sacrificial core truss panel Removal of the sacrificial core truss panel will typically also remove the separately fabricated feature, leaving behind a free-standing hollow core truss panel with a seamlessly embedded hollow feature. In other embodiments, the separately fabricated feature is made of a material that is difficult to remove, such as but not limited to a type of metal. In those cases, the plated feature can remain and provide further structural support, improve radiation shielding, or any other purpose.

Figure 10:
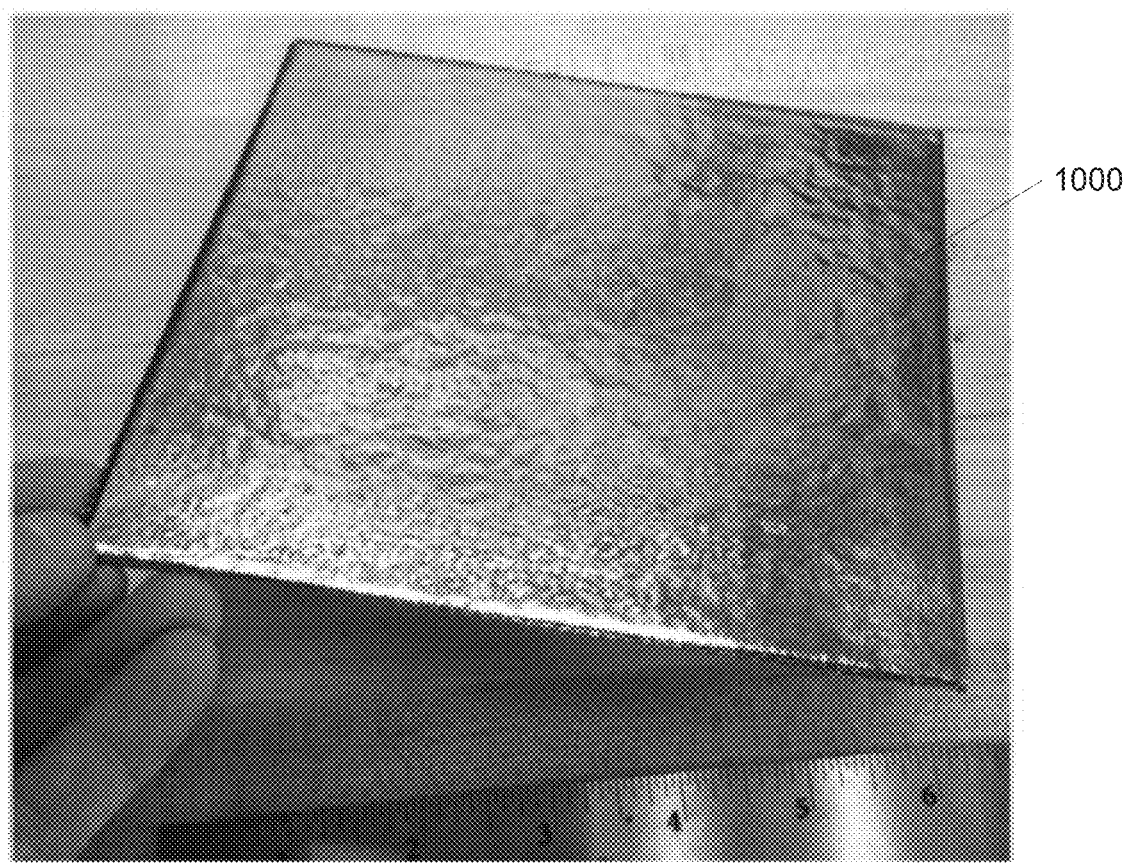
FIG. 10 conceptually illustrates a face sheet that can be combined with a metal core truss panel in accordance with an embodiment of the invention.

In many embodiments, a feature is inserted into a metal core truss panel by drilling a hole in the panel and bonding the feature into the hole using the severed walls of the truss as nodes for bonding the insert. In some embodiments, the metal core truss panel is attached to face sheet panels. FIG. 10 conceptually illustrates a face sheet panel 1000 made of a metallic glass laminate material in accordance with an embodiment of the invention. A feature can be inserted by drilling a hole through the face sheet panel into the metal core truss panel and the feature includes hooks or expanding features that extend beyond the outer perimeter of the drilled hole into the space between the truss walls to allow for latching and prevention of "pull-out."

Although specific methods of fabricating a metal core truss panel with seamlessly embedded features are discussed above, many different fabrication methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for producing a metal core truss panel composite, the method comprising:
   interconnecting a plurality of sacrificial core truss members to fabricate a sacrificial panel,
      wherein each sacrificial core truss member of the plurality of sacrificial core truss members is interconnected with at least one other sacrificial core truss member, such that the plurality of sacrificial core truss members forms an ordered three-dimensional sacrificial core truss structure characterized by a regular pattern;
   incorporating at least one feature distinct from any sacrificial core truss member of the plurality of sacrificial core truss members and any part thereof to the sacrificial panel, wherein the incorporated at least one feature does not conform with the regular pattern of the sacrificial core truss structure and provides a connection point for interconnecting with an external object; and
   plating the ordered three-dimensional sacrificial core truss structure and the incorporated at least one feature with a layer of a metal to form a metal panel comprising a plurality of metal truss members and at least one incorporated metal feature, wherein the at least one incorporated metal feature allows interconnecting of the external object with the metal panel at the same connection point.

2. The method of claim 1, wherein interconnecting the plurality of sacrificial core truss members further comprises:
providing an amount of uncured monomer;
shaping and interconnecting the amount of uncured monomer into the plurality of sacrificial core truss members;
curing the amount of uncured monomer into a cured polymer, wherein the cured polymer forms the sacrificial panel.

3. The method of claim 2, further comprising:
removing the sacrificial core truss panel leaving behind a hollow metal core truss panel comprising a plurality of interconnected hollow metal truss members and at least one seamlessly embedded functional hollow metal feature.

4. The method of claim 2, wherein the feature comprises an insert core truss panel and an embedded feature, wherein attaching the feature comprises: removing a portion of the sacrificial core truss panel, wherein the removed portion is the same size as the insert core truss panel; and bonding the insert core truss panel into the sacrificial core truss panel where the removed portion used to be.

5. The method of claim 4, wherein the insert core truss panel comprises a plurality of insert interconnected truss members with each of the insert interconnected truss members having an approximately similar diameter as each of the plurality of interconnected truss members.

6. The method of claim 2, wherein the uncured monomer is cured using stereolithography fabrication and the feature is provided by 3D printing fabrication.

7. The method of claim 1, wherein fabricating a sacrificial core truss panel comprises: providing an amount of uncured monomer; placing the feature into the amount of uncured monomer; and curing the amount of uncured monomer into cured polymer, wherein the cured polymer forms the plurality of interconnected truss members, wherein the functional feature is embedded in the plurality of interconnected truss members.

8. The method of claim 7, wherein the functional feature comprises a type of metal.

9. The method of claim 8, wherein the type of metal is selected from the group consisting of metallic glass, Al, Ti, Ni, and Au.

10. The method of claim 1, wherein at least one of the at least one incorporated metal feature is selected from the group consisting of an insert, a flexure, a latch, a hook, a fastener, a cabling, a fin, a screw device, and a bolting device.

11. The method of claim 1, wherein the at least one feature comprises a set of screw threads that are smaller than a desired size, such that after the plating the at least one incorporated metal feature comprises a set of metal screw threads with the desired size.

12. The method of claim 1, wherein the plating is conducted using a method selected from the group consisting of electroplating, electrolessly plating, and sputtering.

13. The method of claim 1, further comprising filling a plurality of interstitial voids between the plurality of metal truss members with a material different from the metal used in the plating.

14. The method of claim 1, further comprising attaching a face sheet to the metal panel, wherein the face sheet defines an opening that allows access to the at least one incorporated metal feature.

15. The method of claim 14, wherein the face sheet comprises a carbon fiber laminate material.

16. The method of claim 15, wherein the carbon fiber laminate material comprises at least one embedded layer of metallic glass.

17. The method of claim 14, wherein the face sheet comprises a material selected from the group consisting of: a metallic glass, a monolithic metal, and a metal alloy.

* * * * *